3,373,070
LAMINATES
Peter E. Fuerst, Coshocton, Ohio, assignor to General Electric Company, a corporation of New York
No Drawing. Filed May 1, 1964, Ser. No. 364,319
2 Claims. (Cl. 161—79)

This invention relates to laminates and to processes for preparing laminates. More particularly, the invention relates to new and novel plastic laminates characterized by overlays whose abrasion resistance is enhanced by the inclusion in the fibrous structure of an overlay of silica material, said overlay being clear and highly translucent.

Laminates having surfaces possessing various properties are well known. However, because of the increasingly widespread use of laminates in such applications as surfacing for counters, tables, desks, appliances and other installations for both commercial and home use, the demands upon these laminates and particularly upon their wear or abrasion resistance qualities have become more and more exacting. On the other hand, improvements in the wearability and abrasion resistance of such laminates have tended to resist solution. The principal reason for this resides in the multitude of seemingly inconsistent properties which the laminate surface must possess. It has been generally found that improvements in abrasion resistance have been accompanied by an adverse effect on one or more of the remaining required properties of the laminate surface. A conventional laminate, such as a decorative laminate, comprises three essential parts: a wear surface layer or so-called overlay, a print or pattern layer beneath the wear overlay, and a core layer supporting the wear surface and print layers. The critical part of the laminate insofar as abrasion resistance is concerned is, of course, the wear surface layer or overlay. This overlay almost universally consists of a sheet of translucent overlay paper impregnated with a thermosetting resin, usually a melamine resin. The overlay paper is generally a very high quality thin sheet of paper manufactured from purified viscose, rayon fibers, cellulose fibers, such as alpha cellulose fibers or other similar materials, or from mixtures of the foregoing materials, all of which are well known to those skilled in the art.

Siliceous or silica materials have heretofore been used in coating compositions in general in order to improve abrasion resistance. However, if siliceous materials are incorporated in the treating varnish or resin for paper overlays used in the above described laminates, although improved abrasion resistance may be achieved, the result is usually a laminate having poor craze resistance, poor print clarity, surfaces which are brittle or, in many cases, a combination of more than one of the foregoing deficiencies. Thus, attempts to use siliceous materials including silica, silicates, glass fibers, clear asbestos and the like, although successful in increasing abrasion resistance, have resulted in adversely affecting one or more of the remaining properties of the laminate surface. A primary reason for this difficulty resides in the fact that the overlay sheet itself prevents the homogeneous dispersion of the siliceous resin filler, the overlay paper in effect acting as a filter for the siliceous material. After, for example impregnating an overlay paper with a resin or varnish comprising finely ground silica flour, the impregnated overlay sheet usually contains a silica-rich resinous coating on the top and bottom surfaces and a silica-poor resinous composition in the middle. Actual abrasion tests on such a laminate have shown that the abrasion resistance is high on the top of the surface of the overlay, becomes extremely low in the middle of the overlay and again becomes high on the bottom surface of the overlay. If finer silica than ground silica is used, for example, fumed silica, or silica aerogel, in an attempt to obtain uniform distribution of silica within the overlay sheet, a treating problem is encountered. Then the treating composition becomes so viscous that the overlay paper does not pick up a sufficient amount of resin, that is, the resinous solution has such an extremely high viscosity that it will not properly soak into the overlay paper. The lack of homogeneous dispersion of silica resin fillers throughout such overlay papers also results in mottling of the finished laminate or undesirable variations in gloss or light reflection. Crazing also results from localized concentrations of silica.

One method of overcoming the above deficiencies is set forth in copending application Ser. No. 32,653 filed May 31, 1960, now Patent 3,135,643, issued June 2, 1964, and assigned to the same assignee as this invention. According to this application, there is provided a surface coating composition comprising a thermosetting resin silica flour and finely divided fibrous material in the form of discrete fibers having a refractive index which, like that of the silica, is approximately that of the cured thermosetting resin, so that the cured layer is clear and highly translucent. This coating composition takes the place of the overlay paper and greatly improves the abrasion resistance of laminates to which it is applied. According to another copending application S.N. 354,968 filed Mar. 26, 1964, also assigned to the same assignee as this invention, there is provided a somewhat similar surface coating composition, except that in lieu of the finely divided fibrous material there is substituted a microcrystalline material which serves to uniformly distribute and maintain the silica in uniform concentration throughout the resin layer. Such a microcrystalline material is "Avirin" or "Avicel" produced by the American Viscose Corporation.

A principal object of the present invention is to provide abrasion-resistant decorative laminates.

Briefly, according to the present invention, there is provided a decorative laminate having a resin impregnated core and print layer, there being superimposed upon the print layer an overlay containing silica, said silica being incorporated in the overlay structure during the manufacture of the overlay paper itself. The silica filler can be incorporated in the overlay fibers at any desired point prior to the formation of the paper itself. For example, the silica flour may be added in the pulper or, if indicated, in the head box or at other points during the paper making process where thorough mixing can be carried out. Since both the silica and the overlay fibrous material are clear and highly translucent or have a refractive index which is substantially identical to that of the thermosetting resin, there is combined with the superior abrasion resistance of the present overlay no loss of any decorative effect of the underlying print layer. Furthermore, since the silica is uniformly distributed throughout the overlay structure, there is no mottling or variation in gloss. The fibers hold the silica by forming a network around each particle. This prevents mottle by not permitting silica particles to be torn out of the surface by brushing or abrading action. This also produces a higher abrasion resistance per unit weight of silica.

The overlay of the present invention fulfills, in addition to its abrasion-resistant qualities, the usual functions of such laminate overlays. Primarily, of course, the overlay acts as a carrier for the resin of this wear surface layer, acting as a mechanical carrier for the resinous material. The overlay paper also acts as a flow restrictor in serving to restrain the flow of the surface coating resin as much as possible into the print sheet, at the same time retaining a certain amount of resin in the print sheet so that a proper distribution of such resin results. The overlay in the present instance acts also in its usual role as a shim by maintaining a certain essential thickness of the surface layer, ordinarly from about 2 to 3 mils above the print sheet. Further, the overlay paper of the present invention acts as a reinforcing layer which resists cracking and crazing of the surface.

The resins used for impregnating the cores of laminates made according to this invention can be any of those thermosetting resins conventionally used in the production of laminates. Perhaps the most common of these resins is a condensation product of a phenol and an aldehyde and generally an alkaline catalyzed phenol-formaldehyde condensation product. However, the core stock of the invention can be varied in accordance with the particular properties desired, and the manner of preparation of the core, both as to the composition of the core itself and the impregnating resin, is not a critical part of the invention.

The core stock of the laminates is prepared in any usual manner, it consisting typically of about eight sheets of 11 mil thick kraft paper impregnated with a thermosetting resin such as that above. Often a 50% solution of the laminating resin is used with the final resin solids content of the core stock being about 40% of the total weight of the core. Typically, the sheets are oven dried after impregnation for a period of from about one to two minutes at a temperature of from about 140° C. to 170° C.

The resin used for impregnating and coating the print sheet and the overlay of the present laminates is preferably a condensation product of melamine and an aldehyde because of the excellent wear properties of such resins, their translucency and resistance to discoloration. However, resins prepared from other aminotriazines, urea, dicyandiamide, light colored, highly purified phenolic resins, polyester resins, such as those of the unsaturated alkyd-vinyl monomer types, acrylics, ethoxyline resins, and cross-linked linear resins can also be used. Among those melamine resins which are suitable are those more fully described in U.S. Patent 2,605,205 issued July 29, 1952.

A particular melamine surface impregnating resin useful in connection with this invention is a modified melamine-formaldehyde reaction product produced by the American Cyanamid Company and sold under the name "Cymel" 428. This resin is a white, free-flowing powder specifically designed for the treatment of paper to be used in decorative laminates. The resin is readily soluble in water or in alcohol-water solvents and gives a clear, colorless solution which is stable at 50% solids content for at least two days at room temperature. Typical properties of a 50% aqueous solution of this resin at 25° C., include a pH of about 8.8 to 9.6, a Gardner viscosity of A to B, a solids content at maximum dilution in water of 26%, and a solids content at maximum dilution in 90 parts by volume water and 10 parts by volume of 2B alcohol of 14%.

A phenolic resin which can be used in connection with the present invention as a surface impregnating resin is a light colored, thermosetting, general purpose phenol-formaldehyde resin sold by the Monsanto Chemical Company under the name of "Resinox" 47. A typical polyester which can be used in this respect is a general purpose, thermosetting resin made by reacting two moles of propylene glycol, one mole of maleic anhydride and one mole of phthalic anhydride, 70 parts of such polyester being copolymerized with 30 parts of styrene.

The silica typically used in connection with the present invention is finely divided, pure white silica flour produced by the Pennsylvania Pulverizing Company, Pittsburgh, Pa., and sold under the names 30 Micron "Min-U-Sil Silica" and "Opal Silica." These silicas are substantially pure silicon oxide. In a typical 30 Micron "Min-U-Sil Silica," 97% by weight has a particle size of less than 30 microns, with an average particles size of 3 microns and substantially no particles of a size over 40 microns. The color (reflectance) is 83.5 and the surface area 5400 cm.$^2$/gram. The pH is 7.0, and the bulk density 63.0 lb./cu. ft. A typical "Opal Silica" has a particle size of 0.9 plus 325 mesh and the color (reflectance) is 83.5. About 99.3% by weight of the "Opal Silica" is finer than 43 microns and the average particle size is about 11.9 microns. The surface area of this material is 7300 cm.$^2$/gram and the pH is 7.0. The bulk density of the material is 68.6 lb./cu. ft. Still another useful silica produced by the same company is "25 Micron Silica" having an average particle size of 7.2 microns and substantially no particles larger in size than 30 microns. Mixtures of silicas are also used and other useful silicas will occur to those skilled in the art.

Generally speaking, finely divided silicas substantially free of extraneous color are useful in connection with the present invention. Natural occurring silica in the form of silica flour has been found to give excellent results. The maximum particle size of the silica is limited by processing rather than product considerations, silicas having particles ranging in size up to 40 microns with an average size of five to ten microns being preferred. No advantage seems to accrue as mentioned above from the use of very fine particle silicas, as, for example, the silica aerogels. The particle size of the silica will therefore depend on the amount of abrasion resistance desired on the laminate surface and process limitations.

The fibrous materials used to prepare the overlay paper can be alpha cellulose or other types of refined cellulose fibers or rayon fibers or mixtures of such fibers, such as those described in U.S. Patent 2,816,851, as being useful for the purpose, among others. It is, of course, necessary when preparing decorative laminates that the refractive indices or transparency of the fibers be such that there is little or no blocking of the underlying print layer.

The print paper is impregnated to a dry resin content typically of between 33 and 42% by weight, and the impregnated paper, while still wet, should not have an excessively wet solution on the surface. The overlay paper is impregnated with the same resin as the print paper and in the same manner. The overlay and print sheets and core sheets are then cut to size and the impregnated sheets laminated under heat and pressure. Typically, the times of laminating vary from about 15 to 25 minutes, the temperatures from about 130° C. to 150° C., and the pressure from about 1,000 to 1,500 p.s.i. The laminates are cooled while still under pressure to below 40° C. and removed from the press. It will be realized that the above procedure is illustrative only of various ways in which such laminates can be made.

The following examples will illustrate the practice of the present invention.

*Example 1*

There was added to five parts by weight of alpha cellulose pulp one part of a mixture of finely divided silica consisting of by weight one-third 30 "Min-U-Sil" and two-thirds "Opal Silica," described above. After thorough mixing as in a Cowles high speed mixer, a paper about five mils in thickness was prepared on a hand sheet machine using a 100 mesh wire and dried. The paper so prepared also contained 0.135 gram of silica per sq. ft. and weighed 5.5 grams per sq. ft. to give one gram of silica per 40 grams of fiber. The sheet so prepared was thoroughly impregnated by dipping in "Cymel" 428 melamine formaldehyde resin described above and used as the overlay sheet of a decorative laminate prepared as above with curing for about 16 minutes at 135° C. to 145° C. and 1150 p.s.i.

*Example 2*

Example 1 was repeated in every respect except that there was added to the pulp slurry two grams of silica to provide a concentration of 0.48 gram of silica per sq. ft. in the finished hand sheet or one gram of silica per about 11.5 grams of fiber.

Example 3

Example 1 was repeated except that there was added to the pulp slurry three parts of silica per 100 parts of slurry to provide a concentration of 0.65 gram of silica per sq. ft. in the finished hand sheet or about 1 gram of silica per 8.5 grams of fiber.

Example 4

Example 1 was repeated except that there was added to the pulp slurry five parts by weight of silica as above per 100 parts of fiber to provide 0.85 gram of silica per sq. ft. in the hand sheet or about one gram of silica per 6.5 grams of fiber.

Example 5

Example 1 was repeated except that no silica at all was included in the slurry.

Example 6

This example used for comparison purposes was prepared by omitting the overlay sheet and substituting in its place a melamine formaldehyde resinous composition having per 100 parts of melamine resin ("Cymel" 428), twenty parts of microcrystalline cellulose ("Avirin"), and 10 parts of silica to provide one part of silica per two parts of microcrystalline material or one gram of silica per sq. ft. of laminate.

Shown in the table below are physical data relating to abrasion cycle and abrasion rate tests made on the materials of Examples 1 through 6.

TABLE

|  | Ex. 1 | Ex. 2 | Ex. 3 | Ex. 4 | Ex. 5 | Ex. 6 |
|---|---|---|---|---|---|---|
|  | 0.135 g. Silica/sq. ft. | 0.48 g. Silica/sq. ft. | 0.65 g. Silica/sq. ft. | 0.85 g. Silica/sq. ft. | No Silica | 1 g. Silica/sq. ft. |
| Abrasion Cycles | 1,440 | 2,220 | 2,540 | 3,370 | 485 | 900 |
| Abrasion Wear Rate (g./100 cycles) | .035 | .024 | .023 | .019 | .048 | .020 |
| Film Thickness Abraded (Inches) | 0.0029 | 0.0050 | 0.0052 | 0.0049 | 0.002 | 0.0020 |

The abrasion cycle and abrasion rate tests indicated above were performed in accordance with the standards of the National Electrical Manufacturers Association (NEMA), test LP2–1.06. Abrasion cycles are the number of cycles or revolutions of an abrasive covered wheel in contact with the test sample necessary for breakthrough to occur. Abrasion rate is a measure of the number of grams of sample abraded off per 100 revolutions. The NEMA standard specification for minimum wear value (abrasion cycles) is 400 and the NEMA specification for maximum abrasion rate is 0.08 gram per 100 revolutions. Standard laminates having a melamine resin surface seldom have a wear value of over 500, with 550 being considered exceptional. The abrasion rates of standard laminates with melamine resin are rarely below 0.060 to 0.065.

Consideration of the results set forth in the above table make readily apparent the efficacy of the present invention, especially when it is considered that the abrasion cycles and wear rates were obtained with film thicknesses as indicated. For example, the materials of the present Examples 1 through 4 as compared with materials of Example 5 containing no silica withstand from about three times as many abrasion cycles for Example 1 to over seven times as many abrasion cycles for Example 4. With respect to materials containing silica as a part of a coating composition which takes the place of the overlay as in Example 5, the present materials withstand from about 1.6 as many abrasion cycles for Example 1 to about 3.75 times as many abrasion cycles for Example 4. It will be appreciated that in the above Examples 1 through 4, in which the silica-containing fibrous pulp slurry was not recirculated during the overlay paper-making process, more silica was lost from the pulp mixture than were such recirculation used as in a large scale commercial process. In such a recirculating system, up to substantially all of the silica would be retained and the proportion of silica in the overlay accordingly raised with respect to the amount of silica first introduced. Thus, the present invention is not limited to the specific examples set forth but to such silica-containing overlays in general where the silica is mixed with the fibrous pulp during the paper making process.

There are provided, then, by the present invention improved abrasion resistant plastic laminates having a resin impregnated overlay, the paper for which is made from a mixture of finely divided silica and fibrous pump. By reason of the uniform distribution of the silica particles throughout the paper layer, the present materials are characterized by a particularly even reflecting quality or lack of mottling when viewed under light at various angles. They are also characterized by good craze resistance, and when brushed resist tearing of the individual abrasive particles from the surface by reason of their being held firmly in place by the fibrous material of the paper.

What I claim as new and desire to secure by Letters Patent of the United States is:

1. The process of making an abrasion resistant plastic laminate which comprises curing under heat and pressure a resin impregnated core and superimposed print sheet and overlay paper, said overlay paper being prepared by forming a slurry of finely divided silica flour and fibrous material in discrete proportions ranging up to about one part of silica to each part of fibrous material and laying said slurry down in paper-making fashion.

2. An abrasion-resistant plastic laminate comprising a core and print sheet and superimposed thereon a cured thermosetting resin-impregnated overlay paper of fibrous material containing silica flour, said silica being uniformly distributed throughout said paper, the silica particles being held in a network of fibrous material, said silica being present in said paper in weight proportions of about one part of silica to from about six parts to about forty parts of fibrous material, said resin-impregnated overlay paper being clear and highly translucent in its cured condition.

References Cited
UNITED STATES PATENTS

| 3,014,835 | 12/1961 | Feigley et al. | 162—161 |
| 3,122,468 | 2/1964 | Cadotte | 162—161 |
| 1,230,095 | 6/1919 | Baum | 162—181 |
| 2,373,914 | 4/1945 | Quinn | 162—181 |
| 3,123,515 | 3/1964 | Barna. | |
| 3,135,643 | 6/1964 | Michl | 156—278 |

EARL M. BERGERT, *Primary Examiner.*

R. I. SMITH, M. L. KATZ, *Assistant Examiners.*